(12) United States Patent
Rosén et al.

(10) Patent No.: US 12,007,124 B2
(45) Date of Patent: Jun. 11, 2024

(54) DISTRIBUTION PUMP ARRANGEMENT FOR A HYDRAULIC DISTRIBUTION SYSTEM HAVING CHANGING FLOWING DIRECTION

(71) Applicant: E.ON SVERIGE AB, Malmo (SE)

(72) Inventors: Per Rosén, Lund (SE); Jacob Skogström, Lomma (SE); Fredrik Rosenqvist, Helsingborg (SE); Bengt Lindoff, Bjarred (SE)

(73) Assignee: E.ON SVERIGE AB, Malmo (SE)

( * ) Notice: Subject to any disclaimer, the term of this patent is extended or adjusted under 35 U.S.C. 154(b) by 495 days.

(21) Appl. No.: 17/309,589

(22) PCT Filed: Dec. 9, 2019

(86) PCT No.: PCT/EP2019/084188
§ 371 (c)(1),
(2) Date: Jun. 8, 2021

(87) PCT Pub. No.: WO2020/120385
PCT Pub. Date: Jun. 18, 2020

(65) Prior Publication Data
US 2022/0026080 A1 Jan. 27, 2022
US 2023/0045781 A9 Feb. 9, 2023

(30) Foreign Application Priority Data

Dec. 12, 2018 (EP) .................. 18211861

(51) Int. Cl.
*F24D 19/10* (2006.01)
*F24D 3/02* (2006.01)
*G05D 16/20* (2006.01)

(52) U.S. Cl.
CPC .......... *F24D 19/1006* (2013.01); *F24D 3/02* (2013.01); *G05D 16/2073* (2013.01);
(Continued)

(58) Field of Classification Search
CPC ............ F24D 19/1006; F24D 19/1012; F24D 19/1015; F24D 19/1009; F24D 3/02;
(Continued)

(56) References Cited

U.S. PATENT DOCUMENTS

| | | | | |
|---|---|---|---|---|
| 2,246,138 A | * | 6/1941 | Lum | ................... F24D 19/1006 237/63 |
| 2,519,266 A | * | 8/1950 | Main | ................... F24D 19/1006 236/12.12 |
| 2,545,206 A | * | 3/1951 | Main | ................... F24D 19/1006 236/46 F |
| 4,335,848 A | * | 6/1982 | Eidejus | ............... F24D 19/1009 237/63 |

(Continued)

FOREIGN PATENT DOCUMENTS

| | | |
|---|---|---|
| AU | 2016348507 | 5/2018 |
| CN | 1392357 | 1/2003 |

(Continued)

OTHER PUBLICATIONS

International Search Report and Written Opinion of PCT/EP2019/084188, dated Jan. 21, 2020 in 9 pages.

*Primary Examiner* — Steven B McAllister
*Assistant Examiner* — Daniel E. Namay
(74) *Attorney, Agent, or Firm* — Knobbe, Martens, Olson & Bear, LLP

(57) ABSTRACT

A distribution pump arrangement for a bi-directional hydraulic distribution grid can include a hot conduit control valve in a hot conduit; a first distribution pump having an inlet connected to the hot conduit at a first side of the hot conduit control valve, and an outlet connected to the hot conduit at a second side, opposite the first side, of the hot conduit control valve; a pressure difference determining device arranged beyond the second side of the hot conduit control valve and configured to determine a local pressure difference, Δp, between a local pressure of heat transfer liquid in the hot conduit and a local pressure of heat transfer liquid in the cold conduit; and a controller configured to set (Continued)

the distribution pump arrangement based at least in part on Δp.

9 Claims, 4 Drawing Sheets

(52) U.S. Cl.
CPC ....... G05D 16/208 (2013.01); *F24D 2220/02* (2013.01); *F24D 2220/046* (2013.01)

(58) Field of Classification Search
CPC ................ F24D 3/105; F24D 2220/02; F24D 2220/046; F24D 2220/0207; F24D 2220/0235; F24D 2220/0242; F24D 2220/0271; F24D 2220/0292; F24D 10/003; F24D 10/00; F24D 11/001; G05D 16/2073; G05D 16/208; G05D 16/028
USPC .................................. 237/8 A, 65, 56, 59, 63
See application file for complete search history.

(56) References Cited

U.S. PATENT DOCUMENTS

| | | | |
|---|---|---|---|
| 2018/0259196 A1* | 9/2018 | Rosén | F24D 10/003 |
| 2018/0259197 A1* | 9/2018 | Rosén | F24D 19/1006 |
| 2019/0011136 A1* | 1/2019 | Rosén | F24D 19/1069 |
| 2019/0353399 A1* | 11/2019 | Glanville | F24H 9/2007 |
| 2021/0088227 A1* | 3/2021 | Rosén | F24D 19/1006 |
| 2021/0270491 A1* | 9/2021 | Rosén | F24F 11/67 |

FOREIGN PATENT DOCUMENTS

| | | |
|---|---|---|
| CN | 102713206 | 10/2012 |
| CN | 104632703 | 5/2015 |
| CN | 107923159 | 4/2018 |
| EP | 3165831 A | 5/2017 |
| WO | WO 2012/030264 | 3/2012 |
| WO | WO2012030264 | 3/2012 |
| WO | WO 2017/076866 | 5/2017 |
| WO | WO 2017/076868 | 5/2017 |

* cited by examiner

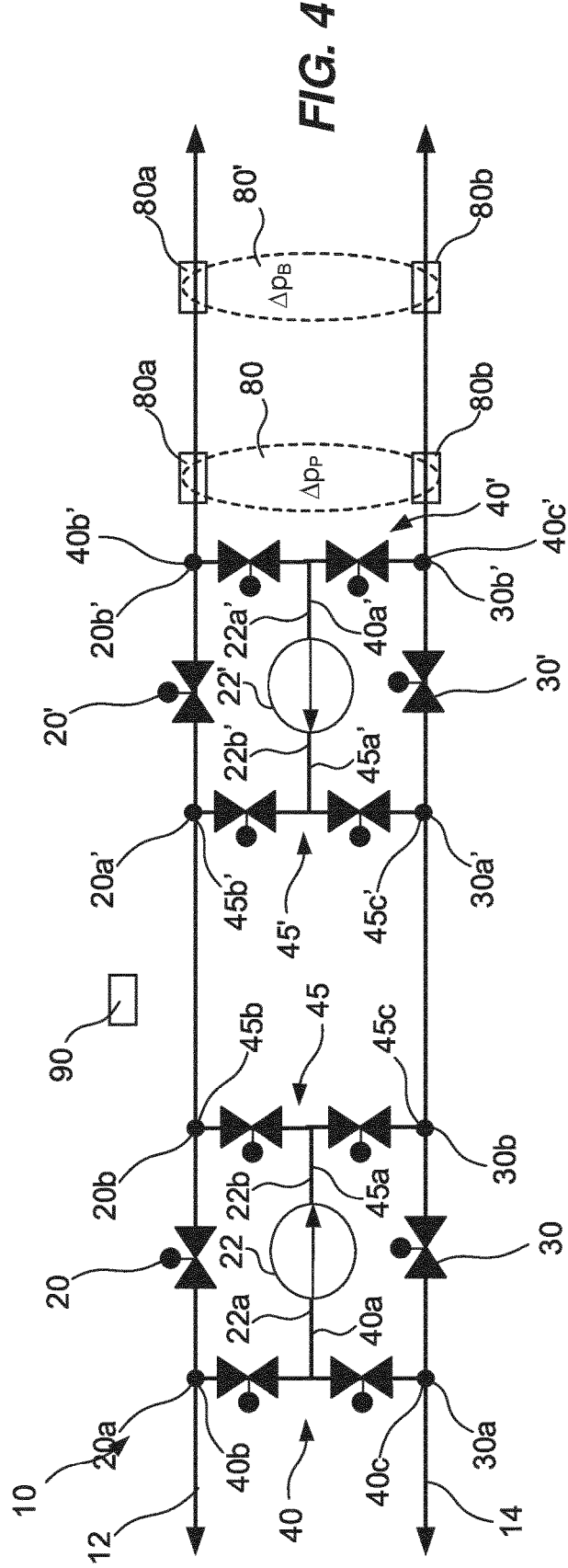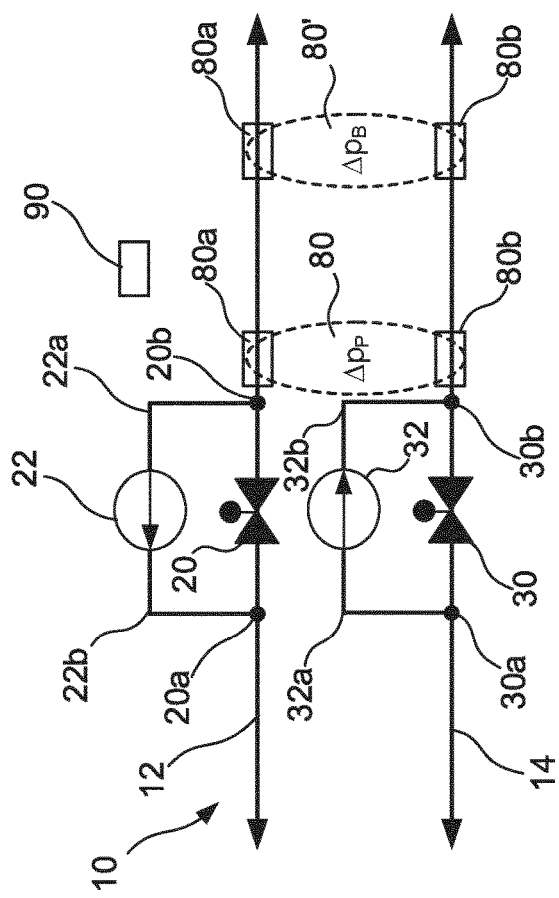

DISTRIBUTION PUMP ARRANGEMENT FOR A HYDRAULIC DISTRIBUTION SYSTEM HAVING CHANGING FLOWING DIRECTION

TECHNICAL FIELD

The present invention relates to a distribution pump arrangement for a bi-directional hydraulic distribution grid.

BACKGROUND

In recent years' bi-directional hydraulic distribution grids configured to distribute thermal energy to and from buildings in a district has been realized. An example of such a bi-directional hydraulic distribution grid has been presented by the applicant under the trademark Ectogrid™. The Ectogrid™ bi-directional hydraulic distribution grid is further described in WO 2017/076868. Such a bi-directional hydraulic distribution grid comprises a hot conduit configured to bi-directionally allow heat transfer liquid of a first temperature to flow therethrough and a cold conduit configured to bi-directionally allow heat transfer liquid of a second temperature to flow therethrough. The second temperature is lower than the first temperature. Assemblies for extracting heat from and/or depositing heat in the bi-directional hydraulic distribution grid are connected to the bi-directional hydraulic distribution grid. Examples of such assemblies are described in WO 2017/076866. The assemblies for extracting heat from and/or depositing heat in the bi-directional hydraulic distribution grid may extract and/or deposit heat independently on a local pressure difference between the hot conduit and the cold conduit. This since the heat transfer liquid is allowed to either flow through an assembly or be pumped through an assembly depending on the local pressure difference between the hot conduit and the cold conduit.

There are design challenges determining type of pumps and valves to be used in a system comprising the bi-directional hydraulic distribution grid and the assemblies for extracting heat from and/or depositing heat in the bi-directional hydraulic distribution grid. This since the local pressure difference may vary freely in the system and the pumps and valves need to be designed for these varying local pressure differences.

SUMMARY OF THE INVENTION

According to a first aspect a distribution pump arrangement for a bi-directional hydraulic distribution grid is provided.

The bi-directional hydraulic distribution grid is configured to distribute thermal energy, the bi-directional hydraulic distribution grid comprising a hot conduit configured to bi-directionally allow heat transfer liquid of a first temperature to flow therethrough and a cold conduit configured to bi-directionally allow heat transfer liquid of a second temperature to flow therethrough, wherein the second temperature is lower than the first temperature.

The distribution pump arrangement comprises: a hot conduit control valve in the hot conduit; a first distribution pump having an inlet connected to the hot conduit at a first side of the hot conduit control valve, and an outlet connected to the hot conduit at a second side, opposite the first side, of the hot conduit control valve; a pressure difference determining device arranged beyond the second side of the hot conduit control valve and configured to determine a local pressure difference, $\Delta p$, between a local pressure, $p_{hot}$, of heat transfer liquid in the hot conduit and a local pressure, $p_{cold}$, of heat transfer liquid in the cold conduit, wherein $\Delta p=|p_{cold}-p_{hot}|$; and a controller.

The controller is configured to: while $\Delta p<$ a threshold value, set the distribution pump arrangement in a flowing mode, wherein the first distribution pump is set to be inactive, and wherein the hot conduit control valve is set to be open, thereby allowing a flow of heat transfer liquid of the hot conduit through the hot conduit control valve; and while $\Delta p\geq$the threshold value and $p_{cold}>p_{hot}$, set the distribution pump arrangement in a hot conduit pumping mode, wherein the hot conduit control valve is set to be closed, thereby stopping a flow of heat transfer liquid of the hot conduit through the hot conduit control valve, and wherein the first distribution pump is set to be active, thereby reducing the local pressure difference.

The distribution pump arrangement allows for design freedom in designing a bi-directional hydraulic distribution grid and the assemblies for extracting heat from and/or depositing heat in the bi-directional hydraulic distribution grid. This since a to high local pressure differences may be handled by the distribution pump arrangement.

According to an embodiment the distribution pump arrangement may further comprise: a cold conduit control valve in the cold conduit; and a second distribution pump having an outlet connected to the cold conduit at a first side of the cold conduit control valve, and an inlet connected to the cold conduit at a second side, opposite the first side, of the cold conduit control valve. The pressure difference determining device may be arranged beyond the second side of the cold conduit control valve. While the distribution pump arrangement is set in the flowing mode the second distribution pump may be set to be inactive. While the distribution pump arrangement is set in the flowing mode the cold conduit control valve may be set to be open, thereby allowing a flow of heat transfer liquid of the cold conduit through the cold conduit control valve. While the distribution pump arrangement is set in the hot conduit pumping mode, the cold conduit control valve may be set to be closed, thereby stopping a flow of heat transfer liquid of the cold conduit through the cold conduit control valve. While the distribution pump arrangement is set in the hot conduit pumping mode, the second distribution pump may be set to be active, thereby reducing the local pressure difference.

According to another embodiment the distribution pump arrangement may further comprise: a cold conduit control valve in the cold conduit; and a second distribution pump having an inlet connected to the cold conduit at a first side of the cold conduit control valve, and an outlet connected to the cold conduit at a second side, opposite the first side, of the cold conduit control valve. The pressure difference determining device may be arranged beyond the second side of the cold conduit control valve. The controller may further be configured to: while $\Delta p\geq$the threshold value and $p_{hot}>p_{cold}$, set the distribution pump arrangement in a cold conduit pumping mode, wherein the cold conduit control valve is set to be closed, thereby stopping a flow of heat transfer liquid of the cold conduit through the cold conduit control valve, and wherein the second distribution pump is set to be active, thereby reducing the local pressure difference. While the distribution pump arrangement is set in the flowing mode the second distribution pump may be set to be inactive. While the distribution pump arrangement is set in the flowing mode the cold conduit control valve may be set to be open, thereby allowing a flow of heat transfer liquid of the cold conduit through the cold conduit control valve. While the distribution pump arrangement is set in the hot conduit pumping mode, the second distribution pump may be set to be inactive. While the distribution pump arrangement is set in the hot conduit pumping mode, the cold conduit control valve may be set to be open, thereby allowing a flow of heat transfer liquid of the cold conduit through the cold conduit control valve. While the distribution pump arrangement is set in the cold conduit pumping mode, the first distribution pump may be set to be inactive. While the distribution pump arrangement is set in the cold conduit pumping mode, the hot conduit control valve may be set to be open, thereby allowing a flow of heat transfer liquid of the hot conduit through the hot conduit control valve.

According to yet another embodiment the distribution pump arrangement may further comprise a cold conduit control valve in the cold conduit, wherein the inlet of the first distribution pump is connected to the hot conduit and to the cold conduit via a first pump inlet valve assembly, and wherein the outlet of the first distribution pump is connected to the hot conduit and to the cold conduit via a first pump outlet valve assembly. The first pump inlet valve assembly comprising: an inlet pump connection connected to the inlet of the first distribution pump; an inlet hot conduit connection connected to the hot conduit at the first side of the hot conduit control valve; and an inlet cold conduit connection connected to the cold conduit at a first side of the cold conduit control valve. The first pump outlet valve assembly comprising: an outlet pump connection connected to the outlet of the first distribution pump, an outlet hot conduit connection connected to the hot conduit at the second side of the hot conduit control valve, and an outlet cold conduit connection connected to the cold conduit at a second side, opposite the first side, of the cold conduit control valve. While the distribution pump arrangement is set in the flowing mode, the cold conduit control valve is set to be open, thereby allowing a flow of heat transfer liquid of the cold conduit through the cold conduit control valve. While the distribution pump arrangement is set in the hot conduit pumping mode, the cold conduit control valve is set to be open, thereby allowing a flow of heat transfer liquid of the cold conduit through the cold conduit control valve. While the distribution pump arrangement is set in the hot conduit pumping mode, the first pump inlet valve assembly is set to fluidly connect the inlet hot conduit connection and the inlet pump connection. While the distribution pump arrangement is set in the hot conduit pumping mode, the first pump outlet valve assembly is set to fluidly connect the outlet pump connection and the outlet hot conduit connection. The controller may further be configured to, while $\Delta p \geq$ the threshold value and $p_{hot} > p_{cold}$, set the distribution pump arrangement in a cold conduit pumping mode. While the distribution pump arrangement is set in the cold conduit pumping mode, the hot conduit control valve is set to be open, thereby allowing a flow of heat transfer liquid of the hot conduit through the hot conduit control valve. While the distribution pump arrangement is set in the cold conduit pumping mode, the cold conduit control valve is set to be closed, thereby stopping a flow of heat transfer liquid of the cold conduit through the cold conduit control valve. While the distribution pump arrangement is set in the cold conduit pumping mode, the first pump inlet valve assembly is set to fluidly connect the inlet cold conduit connection and the inlet pump connection. While the distribution pump arrangement is set in the cold conduit pumping mode, the first pump outlet valve assembly is set to fluidly connect the outlet pump connection and the outlet cold conduit connection. While the distribution pump arrangement is set in the cold conduit pumping mode, the first distribution pump is set to be active, thereby reducing the local pressure difference. While the distribution pump arrangement is set in the hot conduit pumping mode, the first pump inlet valve assembly may be set to fluidly disconnect the inlet cold conduit connection from the inlet pump connection. While the distribution pump arrangement is set in the hot conduit pumping mode, the first pump outlet valve assembly may set to fluidly disconnect the outlet pump connection from the outlet cold conduit connection. While the distribution pump arrangement is set in the cold conduit pumping mode, the first pump inlet valve assembly may be configured to fluidly disconnect the inlet hot conduit connection from the inlet pump connection. While the distribution pump arrangement is set in the cold conduit pumping mode, the first pump outlet valve assembly may be configured to fluidly disconnect the outlet pump connection from the outlet hot conduit connection. While the distribution pump arrangement is set in the flowing mode, the first pump inlet valve assembly may be set to fluidly disconnect the inlet hot conduit connection from the inlet cold conduit connection. While the distribution pump arrangement is set in the flowing mode, the first pump outlet valve assembly may be set to fluidly disconnect the outlet hot conduit connection from the outlet cold conduit connection.

According to another embodiment the distribution pump arrangement may further comprise: a further hot conduit control valve in the hot conduit; a further cold conduit control valve in the cold conduit; a further distribution pump having an inlet and outlet. The outlet of the further distribution pump is connected to the hot conduit and to the cold conduit via a second pump outlet valve assembly. The second pump outlet valve assembly comprising: an outlet pump connection connected to the outlet of the further distribution pump, an outlet hot conduit connection connected to the hot conduit at a first side of the hot conduit control valve, and an outlet cold conduit connection connected to the cold conduit at a first side of the cold conduit control valve. The inlet of the further distribution pump is connected to the hot conduit and to the cold conduit via a second pump inlet valve assembly. The second pump inlet valve assembly comprising: an inlet pump connection connected to the inlet of the further distribution pump, an inlet hot conduit connection connected to the hot conduit at a second side, opposite the first side, of the further hot conduit control valve, and an inlet cold conduit connection connected to the cold conduit at a second side, opposite the first side, of the further cold conduit control valve. While the distribution pump arrangement is set in the flowing mode, the further hot conduit control valve is set to be open, thereby allowing a flow of heat transfer liquid of the hot conduit through the further hot conduit control valve. While the distribution pump arrangement is set in the flowing mode, the further cold conduit control valve is set to be open, thereby allowing a flow of heat transfer liquid of the cold conduit through the further cold conduit control valve. While the distribution pump arrangement is set in the hot conduit pumping mode, the further cold conduit control valve is set to be closed, thereby stopping a flow of heat transfer liquid of the cold conduit through the further cold conduit control valve. While the distribution pump arrangement is set in the hot conduit pumping mode, the second pump inlet valve assembly is set to fluidly connect the inlet cold conduit connection and the inlet pump connection. While the distribution pump arrangement is set in the hot conduit pumping mode, the second pump outlet valve assembly is set to fluidly connect the outlet pump connection and the outlet cold conduit connection. While the distribution pump arrangement is set in the hot conduit pumping mode, the further distribution pump is set to be active, thereby reducing the local pressure difference. While the distribution pump arrangement is set in the cold conduit pumping mode, the further hot conduit control valve is set to be closed, thereby stopping a flow of heat transfer liquid of the hot conduit through the further cold conduit control valve. While the distribution pump arrangement is set in the cold conduit pumping mode, the second pump inlet valve assembly is set to fluidly connect the inlet hot conduit connection and the inlet pump connection. While the distribution pump arrangement is set in the cold conduit pumping mode, the second pump outlet valve assembly is set to fluidly connect the outlet pump connection and the outlet hot conduit connection. While the distribution pump arrangement is set in the cold conduit pumping mode, the further distribution pump is set to be active, thereby reducing the local pressure difference.

According to a second aspect an alternative distribution pump arrangement for the bi-directional hydraulic distribution grid is provided. The alternative distribution pump arrangement comprising: a cold conduit control valve in the cold conduit; a second distribution pump having an inlet connected to the cold conduit at a first side of the cold conduit control valve, and an outlet connected to the cold conduit at a second side, opposite the first side, of the cold conduit control valve; a pressure difference determining device arranged beyond the second side of the cold conduit control valve and configured to determine a local pressure difference, $\Delta p$, between a local pressure, $p_{hot}$, of heat transfer liquid in the hot conduit and a local pressure, $p_{cold}$, of heat transfer liquid in the cold conduit, wherein $\Delta p=|p_{cold}-p_{hot}|$; and a controller. The controller is configured to while $p_{hot} > p_{cold}$ and $\Delta p \geq$ a threshold value: control the cold conduit control valve such that it is closed, thereby stopping a flow of heat transfer liquid of the cold conduit through the hot conduit control valve, and control the second distribution pump such that it is active, thereby reducing the local pressure difference; and while $p_{hot} > p_{cold}$ and $\Delta p <$ the threshold value: control the second distribution pump such that it is inactive, and control the cold conduit control valve such that it is open, thereby allowing a flow of heat transfer liquid of the cold conduit through the cold conduit control valve.

The alternative distribution pump arrangement may further comprise: a hot conduit control valve in the hot conduit; a first distribution pump having an outlet connected to the hot conduit at a first side of the hot conduit control valve, and an inlet connected to the hot conduit at a second side, opposite the first side, of the hot conduit control valve. The pressure difference determining device may be arranged beyond the second side of the hot conduit control valve. The controller may further be configured to: while $p_{hot} > p_{cold}$ and $\Delta p \geq$ the threshold value: control the hot conduit control valve such that it is closed, thereby stopping a flow of heat transfer liquid of the hot conduit through the hot conduit control valve, and control the first distribution pump such that it is active, thereby reducing the local pressure difference; and while $p_{hot} > p_{cold}$ and $\Delta p <$ the threshold value: control the first distribution pump such that it is inactive, and control the hot conduit control valve such that it is open, thereby allowing a flow of heat transfer liquid of the hot conduit through the hot conduit control valve.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures showing embodiments. The figures should not be considered limiting; instead they are used for explaining and understanding.

As illustrated in the figures, the sizes of layers and regions may be exaggerated for illustrative purposes and, thus, are provided to illustrate the general structures of embodiments. Like reference numerals refer to like elements throughout.

FIGS. 1-5 illustrates embodiments of distribution pump arrangements for a bi-directional hydraulic distribution grid.

DETAILED DESCRIPTION

Figure 1:
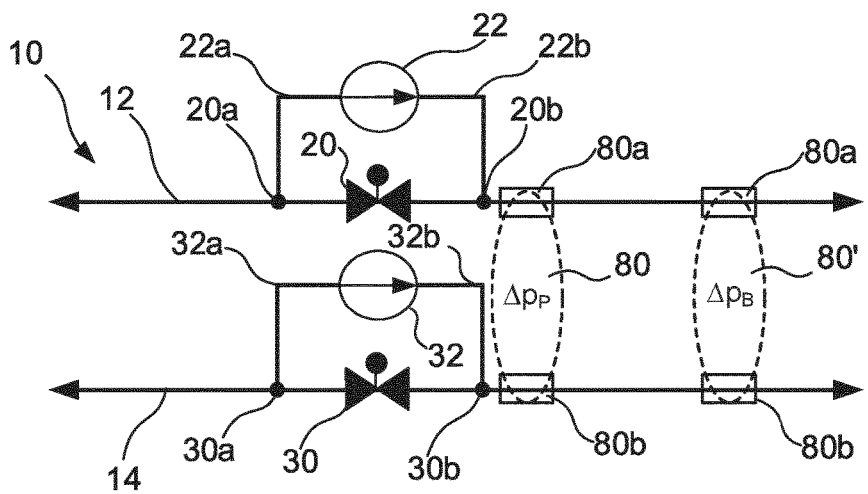

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

In connection with FIGS. 1-5 a number of different embodiments of distribution pump arrangements for a bi-directional hydraulic distribution grid 10 configured to distribute thermal energy will be discussed. The bi-directional hydraulic distribution grid 10 comprises a hot conduit 12 and a cold conduit 14. The hot conduit 12 is configured to bi-directionally allow heat transfer liquid of a first temperature to flow therethrough. The cold conduit 14 is configured to bi-directionally allow heat transfer liquid of a second temperature to flow therethrough. The second temperature is lower than the first temperature.

Assemblies (not shown) for extracting heat from and/or depositing heat in the bi-directional hydraulic distribution grid are connected to the bi-directional hydraulic distribution grid. Examples of such assemblies are described in WO 2017/076866 and EP 18172779. The assemblies for extracting heat from and/or depositing heat in the bi-directional hydraulic distribution grid may extract and/or deposit heat independently on a local pressure difference between the hot conduit and the cold conduit. This since the heat transfer liquid is allowed to either flow through an assembly or be pumped through an assembly depending on the local pressure difference between the hot conduit and the cold conduit.

The local pressure difference between the hot and cold conduits 12, 14 may vary along the bi-directional hydraulic distribution grid 10. Especially, the local pressure difference between the hot and cold conduits 12, 14 may vary from positive to negative pressure difference seen from one of the hot and cold conduits 12, 14. Hence, sometimes a specific assembly for extracting heat from and/or depositing heat in the bi-directional hydraulic distribution grid may need to pump heat transfer liquid through the specific assembly and sometimes the specific assembly may need to let heat transfer liquid flow through the specific assembly.

The heat transfer liquid may comprise water. However, other heat transfer liquids may alternatively be used. Some non-limiting examples are ammonia, oils, alcohols and anti-freezing liquids, such as glycol. The heat transfer liquid may also comprise a mixture of two or more of the heat transfer liquids mentioned above. A specific mixture to be used is water mixed with an anti-freezing liquid.

In case the heat transfer liquid is water (possibly with added anti-freezing liquid), a suitable temperature range for the heat transfer liquid in the hot conduit 12 is between 5 and 45° C. and a suitable temperature range for the heat transfer liquid in the cold conduit 14 is between 0 and 40° C. A suitable temperature difference between the first and second temperatures is in the range of 5-16° C., preferably in the range of 7-12° C., more preferably 8-10° C.

Common for all distribution pump arrangements is that they comprise a distribution pump 22, 22', 32, a control valve 20, 20', 30, 30', a pressure difference determining device 80, 80', and a controller 90. Further, all or some of features of the distribution pump arrangement may be arranged in a chamber or a housing. Especially, the distribution pump 22, 22', 32, the control valve 20, 20', 30, 30' and the controller 90 may be arranged in the chamber or the housing. Also the pressure difference determining device 80, especially a pressure difference determining device 80 located in the vicinity of the distribution pump, may be arranged in a chamber or a housing.

The distribution pump arrangement may comprise one or more control valves 20, 20', 30, 30'. The one or more control valves 20, 20', 30, 30' are arranged in the hot conduit 12 and/or in the cold conduit 14. The one or more control valves 20, 20', 30, 30' are controllable by the controller 90. Hence, the controller 90 is controllably connected to the one or more control valves 20, 20', 30, 30'. Each of the one or more control valves 20, 20', 30, 30' may be independently set in an open state or in a closed state. In the open state, heat transfer liquid is allowed to flow through the control valve 20, 20', 30, 30'. In the closed state, no heat transfer liquid is allowed to flow through the control valve 20, 20', 30, 30'. Each of the one or more control valves 20, 20', 30, 30' comprises a first side 20a, 20a', 30a, 30a' and a second side 20b, 20b', 30b, 30b'. The second side 20b, 20b', 30b, 30b' is opposite to the first side 20a, 20a', 30a, 30a'. Upon the control valve 20, 20', 30, 30' is set in the open state heat transfer liquid is allowed to flow through the control valve 20, 20', 30, 30' from the first side 20a, 20a', 30a, 30a' to the second side 20b, 20b', 30b, 30b' or vice versa. The flow direction through the control valve 20, 20', 30, 30' depend on the local pressures of the heat transfer liquid in hot and cold conduits 12, 14.

The control valve 20, 20', 30, 30' may be a globe valve, an angle valve, a ball valve, a butterfly valve, a plug valve, or any combination thereof.

The distribution pump arrangement may comprise one or more distribution pumps 22, 22', 32. Each of the one or more distribution pumps 22, 22', 32 comprises an inlet 22a, 22a', 32a and an outlet 22b, 22b', 32b. Each of the one or more distribution pumps 22, 22', 32 is controllable by the controller 90. Hence, the controller 90 is controllably connected to the one or more distribution pumps 22, 22', 32. The controller 90 may individually set the one or more distribution pumps 22, 22', 32 in an active state or in an inactive state. In the active state, the distribution pump 22, 22', 32 is configured to pump heat transfer fluid from the inlet 22a, 22a', 32a to the outlet 22b, 22b', 32b. In the inactive state the distribution pump 22, 22', 32 may be configured to stop a flow of heat transfer liquid through the distribution pump 22, 22', 32. The distribution pump 22, 22', 32 may be a frequency controlled distribution pump. The distribution pump 22, 22', 32 may be a rotodynamic pump. The rotodynamic pump may be a centrifugal pump.

The pressure difference determining device 80, 80' is arranged beyond the second side(s) of the one or more control valves 20, 20', 30, 30'. The pressure difference determining device 80, 80' is configured to determine a local pressure difference, Δp, between a local pressure, $p_{hot}$, of heat transfer liquid in the hot conduit 12 and a local pressure, $p_{cold}$, of heat transfer liquid in the cold conduit 14. By local is meant that $p_{hot}$ and $p_{cold}$ are determined in the same region along the bi-directional hydraulic distribution grid 10. In the same region is here referring to within a distance of up to a few meters from each other. The local pressure difference may hence be expressed as:

$$\Delta p = |p_{cold} - p_{hot}|.$$

The pressure difference determining device 80, 80' is further configured to determine if the local pressure, $p_{cold}$, of heat transfer liquid in the cold conduit 14 is higher that the local pressure, $p_{hot}$, of heat transfer liquid in the hot conduit 12 or vice versa. Hence, the pressure difference determining device 80, 80' is configured to determine the sign + or − on the local pressure difference.

The pressure difference determining device 80, 80' may comprises a hot conduit pressure determining device 80a and a cold conduit pressure determining device 80b. The hot conduit pressure determining device 80a is arranged to be connected to the hot conduit 12 for measuring the local pressure, $p_{hot}$, of heat transfer liquid in the hot conduit 12. The cold conduit pressure determining device 80b is arranged to be connected to the cold conduit 14 for measuring the local pressure, $p_{cold}$, of heat transfer liquid in the cold conduit 14. Preferably, the hot conduit pressure determining device 80a and the cold conduit pressure determining device 80b are arranged in a vicinity of each other. That is, in the same region along the bi-directional hydraulic distribution grid 10.

Common for all embodiment disclosed herein is that the distribution pump arrangement may comprise one or more pressure difference determining devices 80, 80'. The one or more pressure difference determining devices 80, 80' may be arranged at different positions within the bi-directional hydraulic distribution grid 10. In the herein discussed embodiments the distribution pump arrangement is illustrated to comprise one pressure difference determining device 80 arranged in vicinity of the one or more distribution pump 22 and one pressure difference determining device 80' arranged in the vicinity of an assembly for extracting heat from and/or depositing heat in the bi-directional hydraulic distribution grid 10. It is realized that the distribution pump arrangement may comprise more than those two pressure difference determining devices 80, 80'. The pressure difference determining device 80 arranged in vicinity of the first distribution pump 22 is configured to determine a local pressure difference in vicinity of the first distribution pump 22. The pressure difference determining device 80' arranged in the vicinity of the assembly for extracting heat from and/or depositing heat in the bi-directional hydraulic distribution grid 10 is configured to determine a local pressure difference in the vicinity of the assembly for extracting heat from and/or depositing heat in the bi-directional hydraulic distribution grid 10. Further, the pressure difference determining devices 80, 80' are arranged beyond the second side of the hot conduit control valve 20.

Although, the distribution pump arrangement is configured to control the local pressure difference at the different specific assembly for extracting heat from and/or depositing heat in the bi-directional hydraulic distribution grid 10, typically it is the local pressure difference measured in the vicinity of the distribution pump 22, 22', 32 that is used for controlling the distribution pump arrangement. This since a local pressure difference in the vicinity of the distribution pump 22, 22', 32 may be translated into a local pressure difference at the different specific assembly for extracting heat from and/or depositing heat in the bi-directional hydraulic distribution grid 10. Local pressure difference readings at a pressure difference determining device 80' located in vicinity to a specific assembly for extracting heat from and/or depositing heat in the bi-directional hydraulic distribution grid 10 may over time be related to local pressure difference readings at the first pressure difference determining device 80 located in vicinity of the distribution pump 22, 22', 32. Hence, the different reading may be used to calibrate and/or correlate the ready outs at the pressure difference determining device 80 located in vicinity of the distribution pump 22, 22', 32. Hence, by determining a local pressure difference at the distribution pump 22, 22', 32 using the pressure difference determining device 80 a local pressure difference at the different assemblies for extracting heat from and/or depositing heat in the bi-directional hydraulic distribution grid 10 may be known.

The controller 90 is further configured to selectively set the distribution pump arrangement in one of a flowing mode, a hot conduit pumping mode, and a cold conduit pumping mode. The setting of the distribution pump arrangement in one of these modes is based on the local pressure difference. Hence, the controller 90 is configured to read out or receive the local pressure difference from the pressure difference determining device 80, 80'. While the local pressure difference is lower than a threshold value, $\Delta p_{crit}$, ($\Delta p < \Delta p_{crit}$) the controller 90 is configured to set the distribution pump arrangement in the flowing mode. While the local pressure difference is equal to or higher than the threshold value, the controller 90 is configured to set the distribution pump arrangement in one of the hot conduit pumping mode and the cold conduit pumping mode. The mode to be used is determined based on if the local pressure, $p_{cold}$, of heat transfer liquid in the cold conduit 14 is higher that the local pressure, $p_{hot}$, of heat transfer liquid in the hot conduit 12 or vice versa. While $\Delta p \geq \Delta p_{crit}$ and $p_{cold} > p_{hot}$, the controller 90 is configured to set the distribution pump arrangement in the hot conduit pumping mode. While $\Delta p \geq \Delta p_{crit}$ and $p_{hot} > p_{cold}$, the controller 90 is configured to set the distribution pump arrangement in the cold conduit pumping mode. While being set it the hot conduit pumping mode or in the cold conduit pumping mode, the distribution pump arrangement is configured to reduce the local pressure difference.

With reference to FIGS. 1-5 different embodiments of the distribution pump arrangement for a bi-directional hydraulic distribution grid 10 will be discussed in more detail. The different embodiments will be discussed individually below. However, it is realized that many of them share similar features and advantages.

First Embodiment

In connection with FIG. 1 a first embodiment of the distribution pump arrangement will be discussed. According to this first embodiment the distribution pump arrangement comprises a hot conduit control valve 20, a hot conduit distribution pump 22, a pressure difference determining device 80, 80', and a controller 90. This first embodiment of the distribution pump arrangement is configured to reduce a local pressure difference between heat transfer fluid of the hot and cold conduits 12, 14 when the local pressure of heat transfer fluid in the cold conduit 14 is higher than the local pressure of heat transfer fluid in the hot conduit 12.

The hot conduit control valve 20 is arranged in the hot conduit 12. The hot conduit control valve 20 is controllable by the controller 90. The hot conduit control valve 20 may be set in either an open state or in a closed state. In the open state, heat transfer liquid of the hot conduit 12 is allowed to flow through the hot conduit control valve 20. In the closed state no heat transfer liquid of the hot conduit 12 is allowed to flow through the hot conduit control valve 20.

The first distribution pump 22 is controllable by the controller 90. The controller 90 may set the first distribution pump 22 in an active state or in an inactive state. The first distribution pump 22 is configured to pump heat transfer liquid of the hot conduit 12. The first distribution pump 22 comprises an inlet 22a and an outlet 22b. The inlet 22a is connected to the hot conduit 12 at a first side 20a of the hot conduit control valve 22. The outlet 22b is connected to the hot conduit 12 at a second side 20b, opposite the first side 20a, of the hot conduit control valve 20.

The controller 90 is configured to control the distribution pump arrangement based on a local pressure difference determined by the one or more pressure difference determining devices 80, 80'. The local pressure difference measured by the pressure difference determining device 80 in vicinity of the first distribution pump 22 may be denoted $\Delta p_P$. The local pressure difference measured by the pressure difference determining device 80' in the vicinity of the assembly for extracting heat from and/or depositing heat in the bi-directional hydraulic distribution grid 10 may be denoted $\Delta p_B$.

Figure 6:
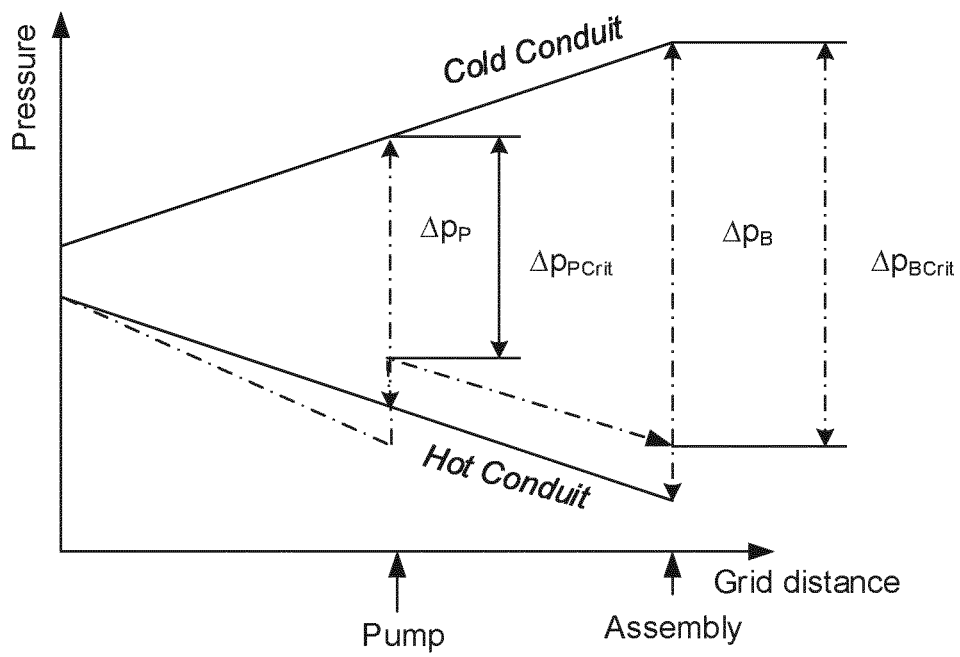
FIGS. 6-9 illustrates operation of the different embodiments of distribution pump arrangements.

With reference to FIG. 6 operation of the controller 90 in connection with this first embodiment of the distribution pump arrangement will be discussed. While the local pressure difference is below a threshold value, $\Delta p_{Crit}$, the controller 90 is configured to set the distribution pump arrangement in the flowing mode. For the two different pressure difference determining devices 80, 80' this may be expressed as: while $\Delta p_B < \Delta p_{BCrit}$, and/or while $\Delta p_P < \Delta p_{PCrit}$; set the distribution pump arrangement in the flowing mode. In the flowing mode the first distribution pump 22 is set to be inactive and the hot conduit control valve 20 is set to be open. In the flowing mode the heat transfer fluid of the hot conduit 12 is allowed to flow freely through the distribution pump arrangement.

Further, while the local pressure of the heat transfer fluid of the cold conduit 14, $p_{cold}$, is higher than the local pressure of the heat transfer fluid of the hot conduit 12, $p_{hot}$, and the local pressure difference is at or above the threshold value, the controller 90 is configured to set the distribution pump arrangement in the hot conduit pumping mode. Referring to FIG. 6 this may be expressed as: while $p_{cold} > p_{hot}$ and $\Delta p_B \geq \Delta p_{BCrit}$ and/or while $p_{cold} > p_{hot}$ and $\Delta p_P \geq \Delta p_{PCrit}$; set the distribution pump arrangement in the hot conduit pumping mode. In the hot conduit pumping mode the first distribution pump 22 is set to be active and the hot conduit control valve 20 is set to be closed. By activating the first distribution pump 22 the local pressure difference will be reduced. This is illustrated as the dash dotted line in connection with the pressure in the hot conduit in FIG. 6.

Second Embodiment

Figure 2:
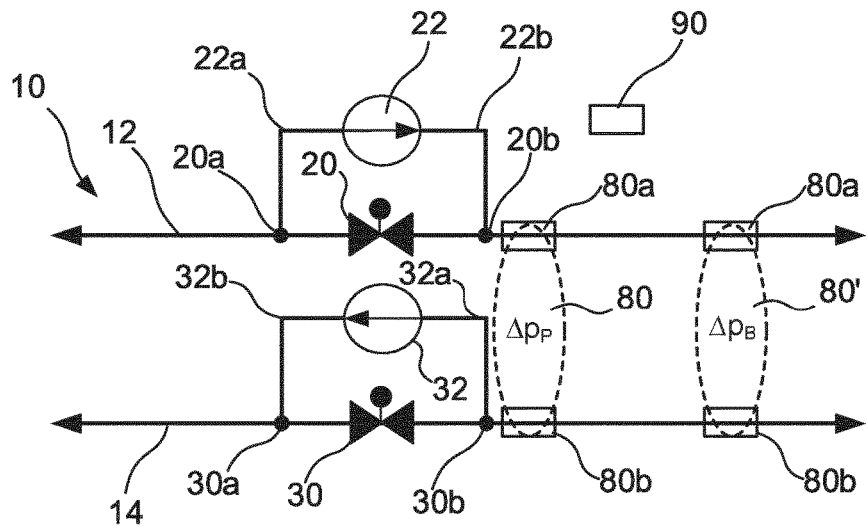

In connection with FIG. 2 a second embodiment of the distribution pump arrangement will be discussed. In addition to the first embodiment of the distribution pump arrangement this second embodiment further comprises a cold conduit control valve 30 and a cold conduit distribution pump 32. Just as the first embodiment of the distribution pump arrangement this second embodiment is configured to reduce a local pressure difference between heat transfer fluid of the hot and cold conduits 12, 14 when the local pressure of heat transfer fluid in the cold conduit 14 is higher than the local pressure of heat transfer fluid in the hot conduit 12.

The cold conduit control valve 30 is arranged in the cold conduit 14. The cold conduit control valve 30 is controllable by the controller 90. The cold conduit control valve 30 may be set in either an open state or in a closed state. In the open state, heat transfer liquid of the cold conduit 14 is allowed to flow through the cold conduit control valve 30. In the closed state no heat transfer liquid of the cold conduit 14 is allowed to flow through the cold conduit control valve 30.

The second distribution pump 32 is controllable by the controller 90. The controller 90 may set the second distribution pump 32 in an active state or in an inactive state. The second distribution pump 32 is configured to pump heat transfer liquid of the cold conduit 14. The second distribution pump 32 comprises an inlet 32a and an outlet 32b. The outlet 32b is connected to the cold conduit 14 at a first side 30a of the cold conduit control valve 32. The inlet 22a is connected to the cold conduit 14 at a second side 30b, opposite the first side 30a, of the cold conduit control valve 30.

Again, the controller 90 is configured to control the distribution pump arrangement based on a local pressure difference determined by the one or more pressure difference determining devices 80, 80'. The local pressure difference measured by the pressure difference determining device 80 in vicinity of the first and second distribution pumps 22, 32 may be denoted $\Delta p_P$. The local pressure difference measured by the pressure difference determining device 80' in the vicinity of the assembly for extracting heat from and/or depositing heat in the bi-directional hydraulic distribution grid 10 may be denoted $\Delta p_B$.

Figure 7:
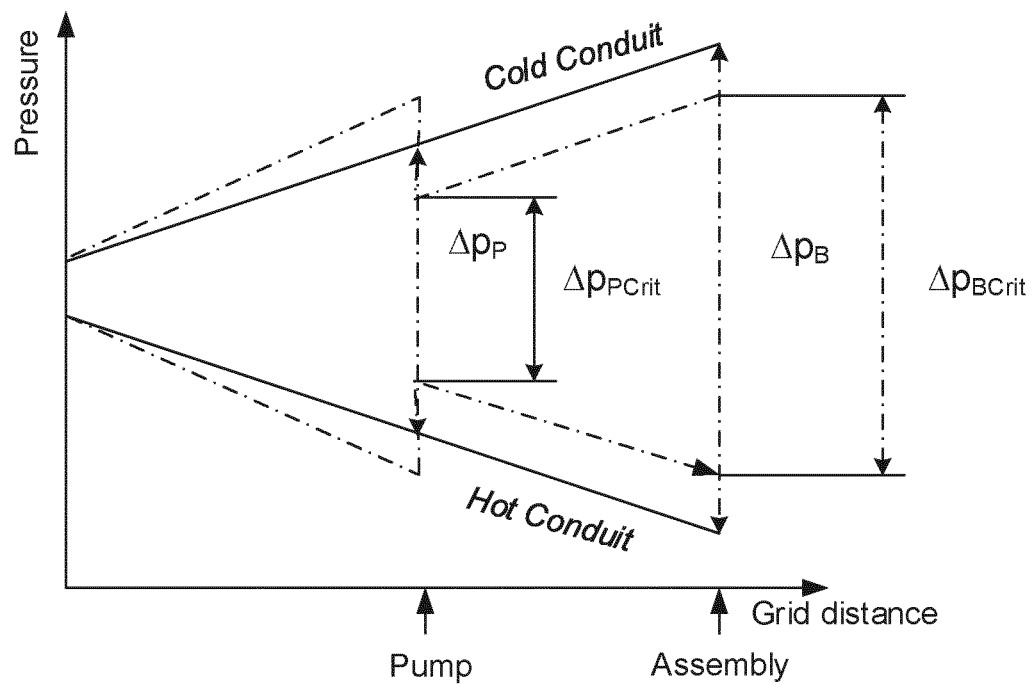

With reference to FIG. 7 operation of the controller 90 in connection with this second embodiment of the distribution pump arrangement will be discussed. While the local pressure difference is below a threshold value, $\Delta p_{crit}$, the controller 90 is configured to set the distribution pump arrangement in the flowing mode. For the two different pressure difference determining devices 80, 80' this may be expressed as: while $\Delta p_B < \Delta p_{BCrit}$ and/or while $\Delta p_P < \Delta p_{PCrit}$; set the distribution pump arrangement in the flowing mode. In the flowing mode the first and second distribution pumps 22, 32 are set to be inactive and the hot and cold conduit control valves 20, 30 are set to be open. In the flowing mode the heat transfer fluid of the hot conduit 12 and of the cold conduit 14 are allowed to flow freely through the distribution pump arrangement.

Further, while the local pressure of the heat transfer fluid of the cold conduit 14, $p_{cold}$, is higher than the local pressure of the heat transfer fluid of the hot conduit 12, $p_{hot}$, and the local pressure difference is at or above the threshold value, the controller 90 is configured to set the distribution pump arrangement in the hot conduit pumping mode. Referring to FIG. 7 this may be expressed as: while $p_{cold} > p_{hot}$ and $\Delta p_B \geq \Delta p_{BCrit}$ and/or while $p_{cold} > p_{hot}$ and $\Delta p_P \geq \Delta p_{PCrit}$; set the distribution pump arrangement in the hot conduit pumping mode. In the hot conduit pumping mode the first and second distribution pumps 22, 32 are set to be active and the hot and cold conduit control valves 20, 30 are set to be closed. By activating the first distribution pump 22 the local pressure difference will be reduced. This is illustrated as the dash dotted line in connection with the pressure in the hot conduit in FIG. 7. By activating the second distribution pump 32 the local pressure difference will be even further reduced. This is illustrated as the dash dotted line in connection with the pressure in the cold conduit in FIG. 7.

Third Embodiment

Figure 3:
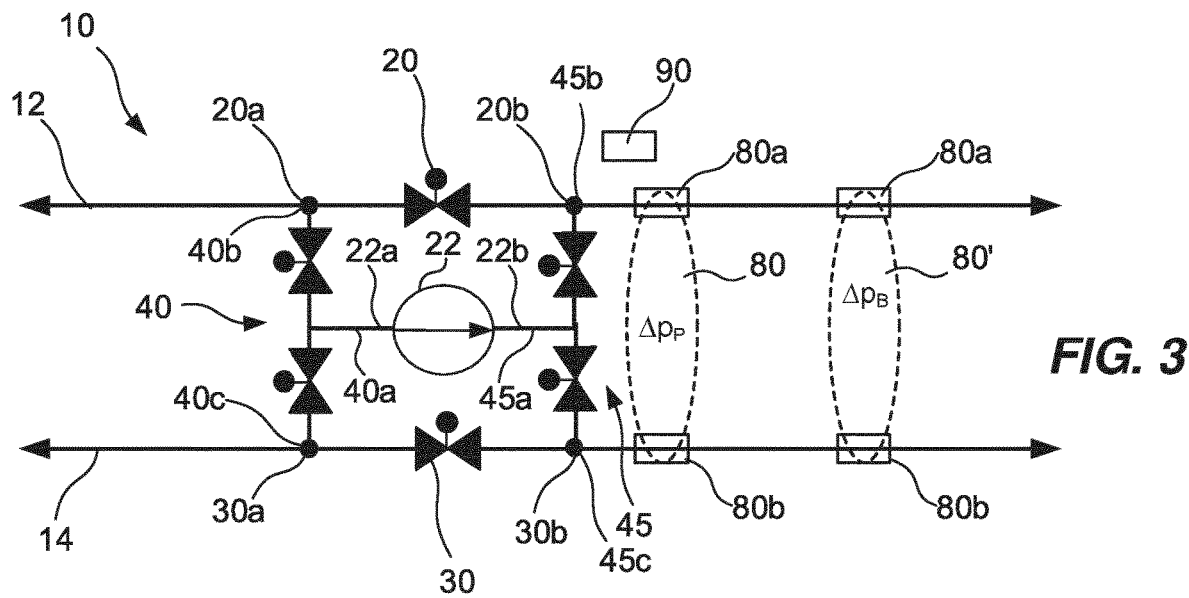

In connection with FIG. 3 a third embodiment of the distribution pump arrangement will be discussed. In addition to the first embodiment of the distribution pump arrangement this third embodiment further comprises a cold conduit control valve 30, a first pump inlet valve assembly 40, and a first pump outlet valve assembly 45. Just as the first embodiment of the distribution pump arrangement this third embodiment is configured to reduce a local pressure difference between heat transfer fluid of the hot and cold conduits 12, 14 when the local pressure of heat transfer fluid in the cold conduit 14 is higher than the local pressure of heat transfer fluid in the hot conduit 12. However, in addition to this, this third embodiment may also be configured to reduce a local pressure difference between heat transfer fluid of the hot and cold conduits 12, 14 when the local pressure of heat transfer fluid in the hot conduit 12 is higher than the local pressure of heat transfer fluid in the cold conduit 14.

The cold conduit control valve 30 is arranged in the cold conduit 14. The cold conduit control valve 30 is controllable by the controller 90. The cold conduit control valve 30 may be set in either an open state or in a closed state. In the open state, heat transfer liquid of the cold conduit 14 is allowed to flow through the cold conduit control valve 30. In the closed state no heat transfer liquid of the cold conduit 14 is allowed to flow through the cold conduit control valve 30.

The inlet 22a of the first distribution pump 22 is connected to the hot conduit 12 and to the cold conduit 14 via the first pump inlet valve assembly 40. The first pump inlet valve assembly 40 comprises an inlet pump connection 40a connected to the inlet 22a of the first distribution pump 22, an inlet hot conduit connection 40b connected to the hot conduit 12 at the first side 20a of the hot conduit control valve 20, and an inlet cold conduit connection 40c connected to the cold conduit 14 at a first side 30a of the cold conduit control valve 30. The first side 30a of the cold conduit control valve 30 corresponds to the first side 20a of the hot conduit control valve 20. The first pump inlet valve assembly 40 may be controlled by the controller 90.

The outlet 22b of the first distribution pump 22 is connected to the hot conduit 12 and to the cold conduit 14 via the first pump outlet valve assembly 45. The first pump outlet valve assembly 45 comprises an outlet pump connection 45a connected to the outlet 22b of the first distribution pump 22, an outlet hot conduit connection 45b connected to the hot conduit 12 at the second side 20b of the hot conduit control valve 20, and an outlet cold conduit connection 45c connected to the cold conduit 14 at a second side 30b, opposite the first side 30a, of the cold conduit control valve 30. The first pump outlet valve assembly 45 may be controlled by the controller 90.

While the distribution pump arrangement according to this third embodiment is set, by the controller 90, in the flowing mode, the hot and cold conduit control valves 20, 30 are set to be open. Further, while the distribution pump arrangement according to this third embodiment is set, by the controller 90, in the flowing mode the first pump inlet valve assembly 40 may be set to fluidly disconnect the inlet hot conduit connection 40b from the inlet cold conduit connection 40c, and the first pump outlet valve assembly 45 may be set to fluidly disconnect the outlet hot conduit connection 45b from the outlet cold conduit connection 45c. Further, while the distribution pump arrangement according to this third embodiment is set, by the controller 90, in the flowing mode the first distribution pump 22 may be set to be inactive.

Moreover, while the distribution pump arrangement according to this third embodiment is set, by the controller 90, in the hot conduit pumping mode, the cold conduit control valve 30 is set to be open and the hot conduit control valve 20 is set to be closed. Further, while the distribution pump arrangement according to this third embodiment is set, by the controller 90, in the hot conduit pumping mode, the first pump inlet valve assembly 40 is set to fluidly connect the inlet hot conduit connection 40b and the inlet pump connection 40a, and set to fluidly disconnect the inlet cold conduit connection 40c from the inlet pump connection 40a. Moreover, while the distribution pump arrangement according to this third embodiment is set, by the controller 90, in the hot conduit pumping mode, the first pump outlet valve assembly 45 is set to fluidly connect the outlet pump connection 45a and the outlet hot conduit connection 45b, and set to fluidly disconnect the outlet pump connection 45a from the outlet cold conduit connection 45c. Furthermore, while the distribution pump arrangement according to this third embodiment is set, by the controller 90, the hot conduit pumping mode, the first distribution pump 22 is set to be active, thereby reducing the local pressure difference.

Referring to FIG. 6 this may be expressed as: while $p_{cold} > p_{hot}$ and $\Delta p_B \geq \Delta p_{BCrit}$ and/or while $p_{cold} > p_{hot}$ and $\Delta p_P \geq \Delta p_{PCrit}$; set the distribution pump arrangement in the hot conduit pumping mode. In the hot conduit pumping mode the first distribution pump 22 is set to be active and the hot conduit control valve 20 is set to be closed. By activating the first distribution pump 22 the local pressure difference will be reduced. This is illustrated as the dash dotted line in connection with the pressure in the hot conduit in FIG. 6.

As indicated above, this third embodiment of the distribution pump arrangement may also be configured to reduce a local pressure difference between heat transfer fluid of the hot and cold conduits 12, 14 when the local pressure of heat transfer fluid in the hot conduit 12 is higher than the local pressure of heat transfer fluid in the cold conduit 14. Differently expressed, this third embodiment may of the distribution pump arrangement may be set in the cold conduit pumping mode. Hence, the controller 90 may further be configured to, while the local pressure of heat transfer fluid in the hot conduit 12 is higher than the local pressure of heat transfer fluid in the cold conduit 14 and the local pressure difference is at or above the threshold value set the distribution pump arrangement in a cold conduit pumping mode.

Figure 8:
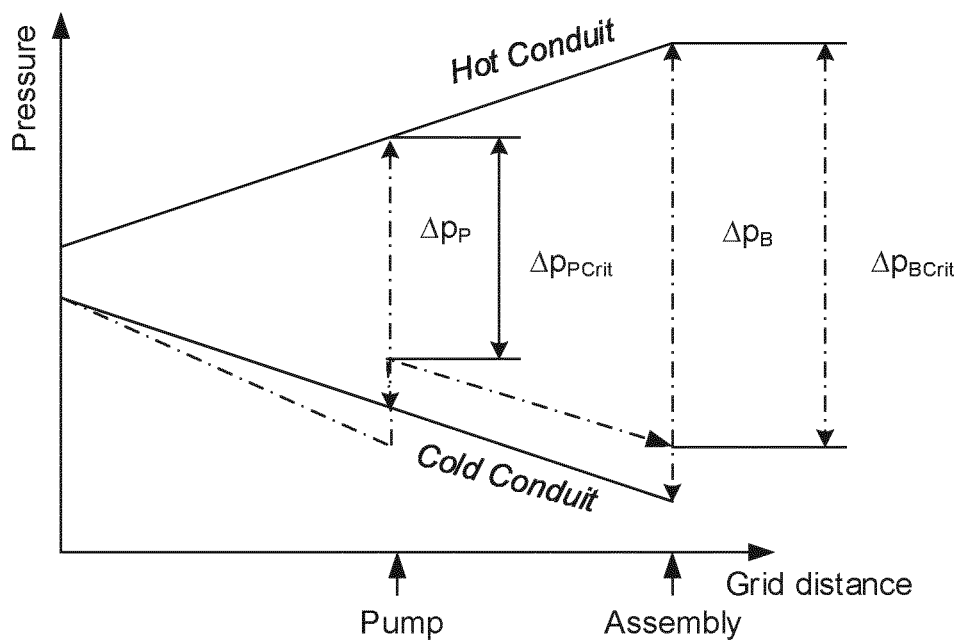

In the cold conduit pumping mode, the controller 90 is configured to set the hot conduit control valve 20 to be open and the cold conduit control valve 30 to be closed. Further, in the cold conduit pumping mode, the controller 90 is configured to set the first pump inlet valve assembly 40 to fluidly connect the inlet cold conduit connection 40c and the inlet pump connection 40a, and to fluidly disconnect the inlet hot conduit connection 40b from the inlet pump connection 40a. Moreover, in the cold conduit pumping mode, the controller 90 is configured to set the first pump outlet valve assembly 45 to fluidly connect the outlet pump connection 45a and the outlet cold conduit connection 45c, and to fluidly disconnect the outlet pump connection 45a from the outlet hot conduit connection 45b. Further, in the cold conduit pumping mode, the controller 90 is configured to set the first distribution pump 22 to be active, thereby reducing the local pressure difference. This is illustrated in connection with FIG. 8. Referring to FIG. 8 this may be expressed as: while $p_{cold} > p_{hot}$ and $\Delta p_B \geq \Delta p_{BCrit}$ and/or while $p_{cold} > p_{hot}$ and $\Delta p_P \geq \Delta p_{PCrit}$; set the distribution pump arrangement in the cold conduit pumping mode. In the cold conduit pumping mode the first distribution pumps 22 is set to be active, the hot conduit control valve 20 is set to be open, and the cold conduit control valve 30 is set to be closed. By activating the first distribution pump 22 the local pressure difference will be reduced. This is illustrated as the dash dotted line in connection with the pressure in the cold conduit in FIG. 8.

Fourth Embodiment

In connection with FIG. 1 a fourth embodiment of the distribution pump arrangement will be discussed. According to this fourth embodiment the distribution pump arrangement comprises a cold conduit control valve 30, a second distribution pump 32, a pressure difference determining device 80, 80', and a controller 90. This fourth embodiment of the distribution pump arrangement is configured to reduce a local pressure difference between heat transfer fluid of the hot and cold conduits 12, 14 when the local pressure of heat transfer fluid in the hot conduit 12 is higher than the local pressure of heat transfer fluid in the cold conduit 14.

The cold conduit control valve 30 is arranged in the cold conduit 14. The cold conduit control valve 30 is controllable by the controller 90. The cold conduit control valve 30 may be set in either an open state or in a closed state. In the open state, heat transfer liquid of the cold conduit 14 is allowed to flow through the hot conduit control valve 30. In the closed state no heat transfer liquid of the cold conduit 14 is allowed to flow through the cold conduit control valve 30.

The second distribution pump 32 is controllable by the controller 90. The controller 90 may set the second distribution pump 32 in an active state or in an inactive state. The second distribution pump 32 is configured to pump heat transfer liquid of the cold conduit 14. The second distribution pump 32 comprises an inlet 32a and an outlet 32b. The inlet 32a is connected to the cold conduit 14 at a first side 30a of the cold conduit control valve 32. The outlet 32b is connected to the cold conduit 14 at a second side 30b, opposite the first side 30a, of the cold conduit control valve 30.

The controller 90 is configured to control the distribution pump arrangement based on a local pressure difference determined by the one or more pressure difference determining devices 80, 80'. The local pressure difference measured by the pressure difference determining device 80 in vicinity of the second distribution pump 32 may be denoted $\Delta p_P$. The local pressure difference measured by the pressure difference determining device 80' in the vicinity of the assembly for extracting heat from and/or depositing heat in the bi-directional hydraulic distribution grid 10 may be denoted $\Delta p_B$.

With reference to FIG. 8 operation of the controller 90 in connection with this fourth embodiment of the distribution pump arrangement will be discussed. While the local pressure difference is below a threshold value, $\Delta p_{Crit}$, the controller 90 is configured to set the distribution pump arrangement in the flowing mode. For the two different pressure difference determining devices 80, 80' this may be expressed as: while $\Delta p_B < \Delta p_{BCrit}$, and/or while $\Delta p_P < \Delta p_{PCrit}$; set the distribution pump arrangement in the flowing mode. In the flowing mode the second distribution pump 32 is set to be inactive and the cold conduit control valve 30 is set to be open. In the flowing mode the heat transfer fluid of the cold conduit 14 is allowed to flow freely through the distribution pump arrangement.

Further, while the local pressure of the heat transfer fluid of the hot conduit 12, $p_{hot}$, is higher than the local pressure of the heat transfer fluid of the cold conduit 14, $p_{cold}$, and the local pressure difference is at or above the threshold value, the controller 90 is configured to set the distribution pump arrangement in the cold conduit pumping mode. Referring to FIG. 8 this may be expressed as: while $p_{hot} > p_{cold}$ and $\Delta p_B \geq \Delta p_{BCrit}$ and/or while $p_{hot} > p_{cold}$ and $\Delta p_P \geq \Delta p_{PCrit}$; set the distribution pump arrangement in the cold conduit pumping mode. In the cold conduit pumping mode the second distribution pump 32 is set to be active and the cold conduit control valve 30 is set to be closed. By activating the second distribution pump 32 the local pressure difference will be reduced. This is illustrated as the dash dotted line in connection with the pressure in the cold conduit in FIG. 8.

Fifth Embodiment

In connection with FIG. 5 a fifth embodiment of the distribution pump arrangement will be discussed. In addition to the fourth embodiment of the distribution pump arrangement this fifth embodiment further comprises a hot conduit control valve 20 and a hot conduit distribution pump 22. Just as the fourth embodiment of the distribution pump arrangement this fifth embodiment is configured to reduce a local pressure difference between heat transfer fluid of the hot and cold conduits 12, 14 when the local pressure of heat transfer fluid in the hot conduit 12 is higher than the local pressure of heat transfer fluid in the cold conduit 14.

The hot conduit control valve 20 is arranged in the hot conduit 12. The hot conduit control valve 20 is controllable by the controller 90. The hot conduit control valve 20 may be set in either an open state or in a closed state. In the open state, heat transfer liquid of the hot conduit 12 is allowed to flow through the hot conduit control valve 20. In the closed state no heat transfer liquid of the hot conduit 12 is allowed to flow through the hot conduit control valve 20.

The first distribution pump 22 is controllable by the controller 90. The controller 90 may set the first distribution pump 22 in an active state or in an inactive state. The first distribution pump 22 is configured to pump heat transfer liquid of the cold conduit 12. The first distribution pump 22 comprises an inlet 22a and an outlet 22b. The outlet 22b is connected to the hot conduit 12 at the first side 20a of the hot conduit control valve 20. The inlet 22a is connected to the hot conduit 12 at a second side 20b, opposite the first side 20a, of the hot conduit control valve 20.

Again, the controller 90 is configured to control the distribution pump arrangement based on a local pressure difference determined by the one or more pressure difference determining devices 80, 80'. The local pressure difference measured by the pressure difference determining device 80 in vicinity of the first and second distribution pumps 22, 32 may be denoted $\Delta p_P$. The local pressure difference measured by the pressure difference determining device 80' in the vicinity of the assembly for extracting heat from and/or depositing heat in the bi-directional hydraulic distribution grid 10 may be denoted $\Delta p_B$.

Figure 9:
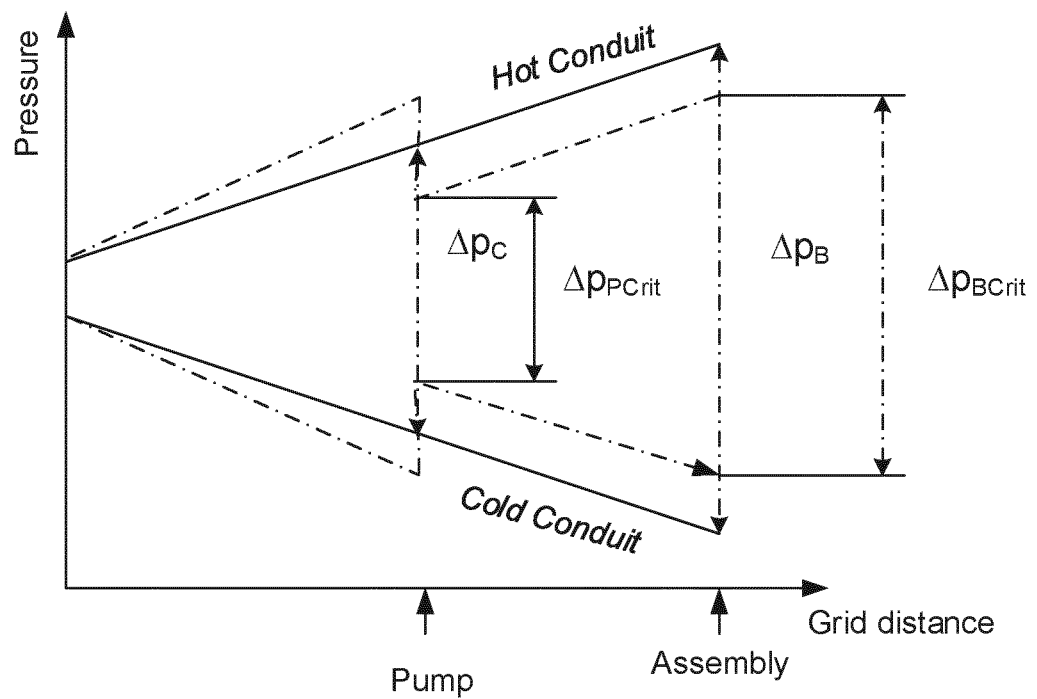

With reference to FIG. 9 operation of the controller 90 in connection with this fifth embodiment of the distribution pump arrangement will be discussed. While the local pressure difference is below a threshold value, $\Delta p_{Crit}$, the controller 90 is configured to set the distribution pump arrangement in the flowing mode. For the two different pressure difference determining devices 80, 80' this may be expressed as: while $\Delta p_B < \Delta p_{BCrit}$, and/or while $\Delta p_P < \Delta p_{PCrit}$; set the distribution pump arrangement in the flowing mode. In the flowing mode the first and second distribution pumps 22, 32 are set to be inactive and the hot and cold conduit control valves 20, 30 are set to be open. In the flowing mode the heat transfer fluid of the hot conduit 12 and of the cold conduit 14 are allowed to flow freely through the distribution pump arrangement.

Further, while the local pressure of the heat transfer fluid of the hot conduit 12, $p_{hot}$, is higher than the local pressure of the heat transfer fluid of the cold conduit 12, $p_{cold}$, and the local pressure difference is at or above the threshold value, the controller 90 is configured to set the distribution pump arrangement in the cold conduit pumping mode. Referring to FIG. 9 this may be expressed as: while $p_{hot} > p_{cold}$ and $\Delta p_B \geq \Delta p_{BCrit}$ and/or while $p_{hot} > p_{cold}$ and $\Delta p_P \geq \Delta p_{PCrit}$; set the distribution pump arrangement in the cold conduit pumping mode. In the cold conduit pumping mode the first and second distribution pumps 22, 32 are set to be active and the hot and cold conduit control valves 20, 30 are set to be closed. By activating the second distribution pump 32 the local pressure difference will be reduced. This is illustrated as the dash dotted line in connection with the pressure in the cold conduit in FIG. 9. By activating the first distribution pump 22 the local pressure difference will be even further reduced. This is illustrated as the dash dotted line in connection with the pressure in the hot conduit in FIG. 9.

Sixth Embodiment

In connection with FIG. 4 a sixth embodiment of the distribution pump arrangement will be discussed. In addition to the third embodiment of the distribution pump arrangement this sixth embodiment further comprises a further hot conduit control valve 20', a further cold conduit control valve 30', a further distribution pump 22', a second pump inlet valve assembly 40', and a second pump outlet valve assembly 45'. Just as the third embodiment of the distribution pump arrangement this sixth embodiment is configured to reduce a local pressure difference between heat transfer fluid of the hot and cold conduits 12, 14 when the local pressure of heat transfer fluid in the cold conduit 14 is higher than the local pressure of heat transfer fluid in the hot conduit 12 or when the local pressure of heat transfer fluid in the hot conduit 12 is higher than the local pressure of heat transfer fluid in the cold conduit 14.

The further hot conduit control valve 20' is arranged in the hot conduit 12. The further hot conduit control valve 20' is controllable by the controller 90. The further hot conduit control valve 20' may be set in either an open state or in a closed state. In the open state, heat transfer liquid of the hot conduit 12 is allowed to flow through the further hot conduit control valve 20'. In the closed state no heat transfer liquid of the hot conduit 12 is allowed to flow through the further hot conduit control valve 20'.

The further cold conduit control valve 30' is arranged in the cold conduit 14. The further cold conduit control valve 30' is controllable by the controller 90. The further cold conduit control valve 30' may be set in either an open state or in a closed state. In the open state, heat transfer liquid of the cold conduit 12 is allowed to flow through the further cold conduit control valve 30'. In the closed state no heat transfer liquid of the hot conduit 12 is allowed to flow through the further cold conduit control valve 30'.

The further distribution pump 22' is controllable by the controller 90. The controller 90 may set the further distribution pump 22' in an active state or in an inactive state. The further distribution pump 22' comprises an inlet 22a' and an outlet 22b'.

The outlet 22b' of the further distribution pump 22' is connected to the hot conduit 12 and to the cold conduit 14 via the second pump outlet valve assembly 45'. The second pump outlet valve assembly 45' comprises an outlet pump connection 45a' connected to the outlet 22b' of the further distribution pump 22', an outlet hot conduit connection 45b' connected to the hot conduit 12 at a first side 20a' of the further hot conduit control valve 20', and an outlet cold conduit connection 45c' connected to the cold conduit 14 at a first side 30a' of the further cold conduit control valve 30'. The first side 30a' of the further cold conduit control valve 30' corresponds to the first side 20a' of the further hot conduit control valve 20'. The first pump outlet valve assembly 45 may be controlled by the controller 90.

The inlet 22a' of the further distribution pump 22' is connected to the hot conduit 12 and to the cold conduit 14 via the second pump inlet valve assembly 40'. The second pump inlet valve assembly 40' comprises an inlet pump connection 40a' connected to the inlet 22a' of the further distribution pump 22', an inlet hot conduit connection 40b' connected to the hot conduit 12 at a second side 20b', opposite the first side 20a', of the further hot conduit control valve 20', and an inlet cold conduit connection 40c' connected to the cold conduit 14 at a second side 30b', opposite the first side 30a', of the further cold conduit control valve 30'. The second pump inlet valve assembly 40' may be controlled by the controller 90.

While the distribution pump arrangement according to this sixth embodiment is set, by the controller 90, in the flowing mode, the hot conduit control valve 20, the further hot conduit control valve 20', the cold conduit control valve 30, and the further cold conduit control valve 30' are set to be open. Further, while the distribution pump arrangement according to this sixth embodiment is set, by the controller 90, in the flowing mode the first pump inlet valve assembly 40 may be set to fluidly disconnect the inlet hot conduit connection 40b from the inlet cold conduit connection 40c, and the first pump outlet valve assembly 45 may be set to fluidly disconnect the outlet hot conduit connection 45b from the outlet cold conduit connection 45c. Further, while the distribution pump arrangement according to this sixth embodiment is set, by the controller 90, in the flowing mode the first distribution pump 22 may be set to be inactive. Further, while the distribution pump arrangement according to this sixth embodiment is set, by the controller 90, in the flowing mode the second pump inlet valve assembly 40' may be set to fluidly disconnect the inlet hot conduit connection 40b' from the inlet cold conduit connection 40c', and the second pump outlet valve assembly 45' may be set to fluidly disconnect the outlet hot conduit connection 45b' from the outlet cold conduit connection 45c'. Moreover, while the distribution pump arrangement according to this sixth embodiment is set, by the controller 90, in the flowing mode the further distribution pump 22' may be set to be inactive.

While the distribution pump arrangement according to this sixth embodiment is set, by the controller 90, in the hot conduit pumping mode, the cold conduit control valve 30 is set to be open and the hot conduit control valve 20 is set to be closed. Further, while the distribution pump arrangement according to this sixth embodiment is set, by the controller 90, in the hot conduit pumping mode, the first pump inlet valve assembly 40 is set to fluidly connect the inlet hot conduit connection 40b and the inlet pump connection 40a, and set to fluidly disconnect the inlet cold conduit connection 40c from the inlet pump connection 40a. Moreover, while the distribution pump arrangement according to this sixth embodiment is set, by the controller 90, in the hot conduit pumping mode, the first pump outlet valve assembly 45 is set to fluidly connect the outlet pump connection 45a and the outlet hot conduit connection 45b, and set to fluidly disconnect the outlet pump connection 45a from the outlet cold conduit connection 45c. Furthermore, while the distribution pump arrangement according to this sixth embodiment is set, by the controller 90, the hot conduit pumping mode, the first distribution pump 22 is set to be active, thereby reducing the local pressure difference. Moreover, while the distribution pump arrangement according to this sixth embodiment is set, by the controller 90, in the hot conduit pumping mode, the further cold conduit control valve 30' may be set to be closed and the further hot conduit control valve 20' may be set to be open. Further, while the distribution pump arrangement according to this sixth embodiment is set, by the controller 90, in the hot conduit pumping mode, the second pump inlet valve assembly 40' may be set to fluidly connect the inlet cold conduit connection 40c' and the inlet pump connection 40a', and set to fluidly disconnect the inlet hot conduit connection 40b' from the inlet pump connection 40a'. Moreover, while the distribution pump arrangement according to this sixth embodiment is set, by the controller 90, in the hot conduit pumping mode, the second pump outlet valve assembly 45' may be set to fluidly connect the outlet pump connection 45a' and the outlet cold conduit connection 45c', and set to fluidly disconnect the outlet pump connection 45a' from the outlet hot conduit connection 45b'. Furthermore, while the distribution pump arrangement according to this sixth embodiment is set, by the controller 90, in the hot conduit pumping mode, the further distribution pump 22 may be set to be active, thereby reducing the local pressure difference further.

With reference to FIG. 7 operation of the controller 90 in connection with this sixth embodiment of the distribution pump arrangement will be discussed. While the local pressure difference is below a threshold value, $\Delta p_{crit}$, the controller 90 is configured to set the distribution pump arrangement in the flowing mode. For the two different pressure difference determining devices 80, 80' this may be expressed as: while $\Delta p_B < \Delta p_{BCrit}$, and/or while $\Delta p_P < \Delta p_{PCrit}$; set the distribution pump arrangement in the flowing mode. In the flowing mode the first and further distribution pumps 22, 22' are set to be inactive and the hot conduit control valve 20, the further hot conduit control valve 20', the cold conduit control valve 30, and the further cold conduit control valve 30' are set to be open. In the flowing mode the heat transfer fluid of the hot conduit 12 and of the cold conduit 14 are allowed to flow freely through the distribution pump arrangement.

Further, while the local pressure of the heat transfer fluid of the cold conduit 14, $p_{cold}$, is higher than the local pressure of the heat transfer fluid of the hot conduit 12, $p_{hot}$, and the local pressure difference is at or above the threshold value, the controller 90 is configured to set the distribution pump arrangement in the hot conduit pumping mode. Referring to FIG. 7 this may be expressed as: while $p_{cold} > p_{hot}$ and $\Delta p_B \geq \Delta p_{BCrit}$ and/or while $p_{cold} > p_{hot}$ and $\Delta p_P \geq \Delta p_{PCrit}$; set the distribution pump arrangement in the hot conduit pumping mode. In the hot conduit pumping mode the first and further distribution pumps 22, 22' are set to be active. Further, the hot conduit control valve 20 and the further cold conduit control valve 30' are set to be closed. Moreover, the further hot conduit control valve 20' and the cold conduit control valve 30 are set to be open. By activating the first distribution pump 22 the local pressure difference will be reduced. This is illustrated as the dash dotted line in connection with the pressure in the hot conduit in FIG. 7. By activating the further distribution pump 22' the local pressure difference will be even further reduced. This is illustrated as the dash dotted line in connection with the pressure in the cold conduit in FIG. 7.

As indicated above, this sixth embodiment of the distribution pump arrangement may also be configured to reduce a local pressure difference between heat transfer fluid of the hot and cold conduits 12, 14 when the local pressure of heat transfer fluid in the hot conduit 12 is higher than the local pressure of heat transfer fluid in the cold conduit 14. Differently expressed, this sixth embodiment may of the distribution pump arrangement may be set in the cold conduit pumping mode. Hence, the controller 90 may further be configured to, while the local pressure of heat transfer fluid in the hot conduit 12 is higher than the local pressure of heat transfer fluid in the cold conduit 14 and the local pressure difference is at or above the threshold value set the distribution pump arrangement in a cold conduit pumping mode.

In the cold conduit pumping mode, the controller 90 is configured to set the hot conduit control valve 20 to be open and the cold conduit control valve 30 to be closed. Further, in the cold conduit pumping mode, the controller 90 is configured to set the first pump inlet valve assembly 40 to fluidly connect the inlet cold conduit connection 40c and the inlet pump connection 40a, and to fluidly disconnect the inlet hot conduit connection 40b from the inlet pump connection 40a. Moreover, in the cold conduit pumping mode, the controller 90 is configured to set the first pump outlet valve assembly 45 to fluidly connect the outlet pump connection 45a and the outlet cold conduit connection 45c, and to fluidly disconnect the outlet pump connection 45a from the outlet hot conduit connection 45b. Further, in the cold conduit pumping mode, the controller 90 is configured to set the first distribution pump 22 to be active, thereby reducing the local pressure difference. This is illustrated in connection with FIG. 9. Referring to FIG. 9 this may be expressed as: while $p_{cold} > p_{hot}$ and $\Delta p_B \geq \Delta p_{BCrit}$ and/or while $p_{cold} > p_{hot}$ and $\Delta p_P \geq \Delta p_{PCrit}$; set the distribution pump arrangement in the cold conduit pumping mode. In the cold conduit pumping mode the first distribution pump 22 is set to be active, the hot conduit control valve 20 is set to be open, and the cold conduit control valve 30 is set to be closed. By activating the first distribution pump 22 the local pressure difference will be reduced. This is illustrated as the dash dotted line in connection with the pressure in the cold conduit in FIG. 9.

Further, in the cold conduit pumping mode, the controller 90 is configured to set the further hot conduit control valve 20' to be closed and the further cold conduit control valve 30' to be open. Further, in the cold conduit pumping mode, the controller 90 is configured to set the second pump inlet valve assembly 40' to fluidly connect the inlet hot conduit connection 40b' and the inlet pump connection 40a', and to fluidly disconnect the inlet cold conduit connection 40c' from the inlet pump connection 40a. Moreover, in the cold conduit pumping mode, the controller 90 is configured to set the second pump outlet valve assembly 45' to fluidly connect the outlet pump connection 45a' and the outlet hot conduit connection 45b', and to fluidly disconnect the outlet pump connection 45a' from the outlet cold conduit connection 45c'. Further, in the cold conduit pumping mode, the controller 90 is configured to set the further distribution pump 22' to be active, thereby further reducing the local pressure difference. This is illustrated in connection with FIG. 9. Referring to FIG. 9 this may be expressed as: while $p_{cold} > p_{hot}$ and $\Delta p_B > \Delta p_{BCrit}$ and/or while $p_{cold} > p_{hot}$ and $\Delta p_P \geq \Delta p_{PCrit}$; set the distribution pump arrangement in the cold conduit pumping mode. In the cold conduit pumping mode the further distribution pump 22' is set to be active, the further hot conduit control valve 20' is set to be closed, and the further cold conduit control valve 30' is set to be open. By activating the further distribution pump 22' the local pressure difference will be reduced. This is illustrated as the dash dotted line in connection with the pressure in the hot conduit in FIG. 9.

The person skilled in the art realizes that the present invention by no means is limited to the preferred embodiments described above. On the contrary, many modifications and variations are possible within the scope of the appended claims.

For example, the first and fourth embodiments of the distribution pump arrangement may be combined in a new embodiment. This new embodiment may be set in one of the flowing mode, the cold conduit pumping mode, and the hot conduit pumping mode.

It is also realized that yet another embodiment of the distribution pump arrangement may be formed by shifting the pumping direction of the distribution pump of the third embodiment illustrated in connection with FIG. 3. Such an embodiment of the distribution pump arrangement may be used in the flowing mode, the hot conduit pumping mode and in the cold conduit pumping mode.

Further, the embodiment of the distribution pump arrangement discussed in connection with FIG. 2 may be mirrored to a distribution pump arrangement illustrated in FIG. 5. The embodiment of FIG. 5 may be set in the flowing mode or in the cold conduit pumping mode. The operation of the FIG. 5 embodiment is illustrated in connection with FIG. 9.

Additionally, variations to the disclosed embodiments can be understood and effected by the skilled person in practicing the claimed invention, from a study of the drawings, the disclosure, and the appended claims.

The invention claimed is:

1. A distribution pump arrangement for a bi-directional hydraulic distribution grid configured to distribute thermal energy, the bi-directional hydraulic distribution grid comprising a hot conduit configured to bi-directionally allow heat transfer liquid of a first temperature to flow therethrough and a cold conduit configured to bi-directionally allow heat transfer liquid of a second temperature to flow therethrough, wherein the second temperature is lower than the first temperature, the distribution pump arrangement comprising:

a hot conduit control valve in the hot conduit;
a first distribution pump having an inlet connected to the hot conduit at a first side of the hot conduit control valve, and an outlet connected to the hot conduit at a second side, opposite the first side, of the hot conduit control valve;
a pressure difference determining device arranged beyond the second side of the hot conduit control valve and configured to determine a local pressure difference, $\Delta p$, between a local pressure, $p_{hot}$, of heat transfer liquid in the hot conduit and a local pressure, $p_{cold}$, of heat transfer liquid in the cold conduit, wherein $\Delta p=|p_{cold}-p_{hot}|$; and
a controller configured to:
while $\Delta p<$ a threshold value, set the distribution pump arrangement in a flowing mode, wherein:
the first distribution pump is set to be inactive, and
the hot conduit control valve is set to be open, thereby allowing a flow of heat transfer liquid of the hot conduit through the hot conduit control valve; and
while $\Delta p \geq$ the threshold value and $p_{cold}>p_{hot}$, set the distribution pump arrangement in a hot conduit pumping mode, wherein:
the hot conduit control valve is set to be closed, thereby stopping a flow of heat transfer liquid of the hot conduit through the hot conduit control valve, and
the first distribution pump is set to be active, thereby reducing the local pressure difference.

2. The distribution pump arrangement according to claim 1, further comprising:
a cold conduit control valve in the cold conduit; and
a second distribution pump having an outlet connected to the cold conduit at a first side of the cold conduit control valve, and an inlet connected to the cold conduit at a second side, opposite the first side, of the cold conduit control valve;
wherein the pressure difference determining device is arranged beyond the second side of the cold conduit control valve;
wherein the controller is further configured to, while the distribution pump arrangement is set in the flowing mode:
set the second distribution pump to be inactive, and
set the cold conduit control valve to be open, thereby allowing a flow of heat transfer liquid of the cold conduit through the cold conduit control valve; and
wherein, the controller is further configured to while the distribution pump arrangement is set in the hot conduit pumping mode:
set the cold conduit control valve is set to be closed, thereby stopping a flow of heat transfer liquid of the cold conduit through the cold conduit control valve, and
set the second distribution pump is set to be active, thereby reducing the local pressure difference.

3. The distribution pump arrangement according to claim 1, further comprising:
a cold conduit control valve in the cold conduit; and
a second distribution pump having an inlet connected to the cold conduit at a first side of the cold conduit control valve, and an outlet connected to the cold conduit at a second side, opposite the first side, of the cold conduit control valve;
wherein the pressure difference determining device is arranged beyond the second side of the cold conduit control valve;
wherein the controller is further configured to:
while $\Delta p \geq$ the threshold value and $p_{hot}>p_{cold}$, set the distribution pump arrangement in a cold conduit pumping mode, wherein:
the cold conduit control valve is set to be closed, thereby stopping a flow of heat transfer liquid of the cold conduit through the cold conduit control valve, and
the second distribution pump is set to be active, thereby reducing the local pressure difference.

4. The distribution pump arrangement according to claim 3, wherein, the controller is further configured to, while the distribution pump arrangement is set in the flowing mode:
set the second distribution pump to be inactive, and
set the cold conduit control valve is set to be open, thereby allowing a flow of heat transfer liquid of the cold conduit through the cold conduit control valve;
wherein, the controller is further configured to while the distribution pump arrangement is set in the hot conduit pumping mode:
set the second distribution pump to be inactive, and
set the cold conduit control valve is set to be open, thereby allowing a flow of heat transfer liquid of the cold conduit through the cold conduit control valve; and
wherein, the controller is further configured to while the distribution pump arrangement is set in the cold conduit pumping mode:
set the first distribution pump to be inactive, and
set the hot conduit control valve to be open, thereby allowing a flow of heat transfer liquid of the hot conduit through the hot conduit control valve.

5. The distribution pump arrangement according to claim 1, further comprising a cold conduit control valve in the cold conduit;
wherein the inlet of the first distribution pump is connected to the hot conduit and to the cold conduit via a first pump inlet valve assembly;
wherein the outlet of the first distribution pump is connected to the hot conduit and to the cold conduit via a first pump outlet valve assembly;
wherein the first pump inlet valve assembly comprises:
an inlet pump connection connected to the inlet of the first distribution pump;
an inlet hot conduit connection connected to the hot conduit at the first side of the hot conduit control valve; and
an inlet cold conduit connection connected to the cold conduit at a first side of the cold conduit control valve;
wherein the first pump outlet valve assembly comprises:
an outlet pump connection connected to the outlet of the first distribution pump,
an outlet hot conduit connection connected to the hot conduit at the second side of the hot conduit control valve, and
an outlet cold conduit connection connected to the cold conduit at a second side, opposite the first side, of the cold conduit control valve;
wherein, the controller is further configured to, while the distribution pump arrangement is set in the flowing mode, set the cold conduit control valve to be open, thereby allowing a flow of heat transfer liquid of the cold conduit through the cold conduit control valve;

wherein, the controller is further configured to, while the distribution pump arrangement is set in the hot conduit pumping mode:
set the cold conduit control valve to be open, thereby allowing a flow of heat transfer liquid of the cold conduit through the cold conduit control valve,
set the first pump inlet valve assembly to fluidly connect the inlet hot conduit connection and the inlet pump connection, and
set the first pump outlet valve assembly to fluidly connect the outlet pump connection and the outlet hot conduit connection; and
wherein the controller is further configured to, while $\Delta p \geq$ the threshold value and $p_{hot} > p_{cold}$, set the distribution pump arrangement in a cold conduit pumping mode, wherein:
the hot conduit control valve is set to be open, thereby allowing a flow of heat transfer liquid of the hot conduit through the hot conduit control valve,
the cold conduit control valve is set to be closed, thereby stopping a flow of heat transfer liquid of the cold conduit through the cold conduit control valve,
the first pump inlet valve assembly is set to fluidly connect the inlet cold conduit connection and the inlet pump connection,
the first pump outlet valve assembly is set to fluidly connect the outlet pump connection and the outlet cold conduit connection, and
the first distribution pump is set to be active, thereby reducing the local pressure difference.

6. The distribution pump arrangement according to claim 5, wherein, the controller is further configured to, while the distribution pump arrangement is set in the hot conduit pumping mode:
set the first pump inlet valve assembly is set to fluidly disconnect the inlet cold conduit connection from the inlet pump connection, and
set the first pump outlet valve assembly to fluidly disconnect the outlet pump connection from the outlet cold conduit connection;
wherein, the controller is further configured to, while the distribution pump arrangement is set in the cold conduit pumping mode:
set the first pump inlet valve assembly to fluidly disconnect the inlet hot conduit connection from the inlet pump connection, and
set the first pump outlet valve assembly to fluidly disconnect the outlet pump connection from the outlet hot conduit connection; and
wherein, the controller is further configured to, while the distribution pump arrangement is set in the flowing mode:
set the first pump inlet valve assembly to fluidly disconnect the inlet hot conduit connection from the inlet cold conduit connection, and
the first pump outlet valve assembly is set to fluidly disconnect the outlet hot conduit connection from the outlet cold conduit connection.

7. The distribution pump arrangement according to claim 5, further comprising:
a further hot conduit control valve in the hot conduit;
a further cold conduit control valve in the cold conduit; and
a further distribution pump having an inlet and outlet;
wherein the outlet of the further distribution pump is connected to the hot conduit and to the cold conduit via a second pump outlet valve assembly;
wherein the second pump outlet valve assembly comprises:
an outlet pump connection connected to the outlet of the further distribution pump,
an outlet hot conduit connection connected to the hot conduit at a first side of the hot conduit control valve, and
an outlet cold conduit connection connected to the cold conduit at a first side of the cold conduit control valve;
wherein the inlet of the further distribution pump is connected to the hot conduit and to the cold conduit via a second pump inlet valve assembly;
wherein the second pump inlet valve assembly comprises:
an inlet pump connection connected to the inlet of the further distribution pump,
an inlet hot conduit connection connected to the hot conduit at a second side, opposite the first side, of the further hot conduit control valve, and
an inlet cold conduit connection connected to the cold conduit at a second side, opposite the first side, of the further cold conduit control valve;
wherein, the controller is further configured to, while the distribution pump arrangement is set in the flowing mode:
set the further hot conduit control valve to be open, thereby allowing a flow of heat transfer liquid of the hot conduit through the further hot conduit control valve, and
set the further cold conduit control valve to be open, thereby allowing a flow of heat transfer liquid of the cold conduit through the further cold conduit control valve;
wherein, the controller is further configured to, while the distribution pump arrangement is set in the hot conduit pumping mode:
set the further cold conduit control valve to be closed, thereby stopping a flow of heat transfer liquid of the cold conduit through the further cold conduit control valve,
set the second pump inlet valve assembly to fluidly connect the inlet cold conduit connection and the inlet pump connection,
set the second pump outlet valve assembly to fluidly connect the outlet pump connection and the outlet cold conduit connection, and
set the further distribution pump to be active, thereby reducing the local pressure difference; and
wherein, the controller is further configured to, while the distribution pump arrangement is set in the cold conduit pumping mode:
set the further hot conduit control valve to be closed, thereby stopping a flow of heat transfer liquid of the hot conduit through the further cold conduit control valve,
set the second pump inlet valve assembly to fluidly connect the inlet hot conduit connection and the inlet pump connection,
set the second pump outlet valve assembly to fluidly connect the outlet pump connection and the outlet hot conduit connection, and
set the further distribution pump to be active, thereby reducing the local pressure difference.

8. A distribution pump arrangement for a bi-directional hydraulic distribution grid configured to distribute thermal energy, the bi-directional hydraulic distribution grid comprising a hot conduit configured to bi-directionally allow heat transfer liquid of a first temperature to flow therethrough and a cold conduit configured to bi-directionally allow heat transfer liquid of a second temperature to flow therethrough, wherein the second temperature is lower than the first temperature, the distribution pump arrangement comprising:
- a cold conduit control valve in the cold conduit;
- a second distribution pump having an inlet connected to the cold conduit at a first side of the cold conduit control valve, and an outlet connected to the cold conduit at a second side, opposite the first side, of the cold conduit control valve;
- a pressure difference determining device arranged beyond the second side of the cold conduit control valve and configured to determine a local pressure difference, $\Delta p$, between a local pressure, $p_{hot}$, of heat transfer liquid in the hot conduit and a local pressure, $p_{cold}$, of heat transfer liquid in the cold conduit, wherein $\Delta p = |p_{cold} - p_{hot}|$; and
- a controller configured to:
  - while $p_{hot} > p_{cold}$ and $\Delta p \geq$ a threshold value:
    - control the cold conduit control valve such that it is closed, thereby stopping a flow of heat transfer liquid of the cold conduit through the cold conduit control valve, and
    - control the second distribution pump such that it is active, thereby reducing the local pressure difference; and
  - while $p_{hot} > p_{cold}$ and $\Delta p <$ the threshold value:
    - control the second distribution pump such that it is inactive, and
    - control the cold conduit control valve such that it is open, thereby allowing a flow of heat transfer liquid of the cold conduit through the cold conduit control valve.

9. The distribution pump arrangement according to claim 8, further comprising:
- a hot conduit control valve in the hot conduit; and
- a first distribution pump having an outlet connected to the hot conduit at a first side of the hot conduit control valve, and an inlet connected to the hot conduit at a second side, opposite the first side, of the hot conduit control valve;
- wherein the pressure difference determining device is arranged beyond the second side of the hot conduit control valve;
- wherein the controller is further configured to:
  - while $p_{hot} > p_{cold}$ and $\Delta p \geq$ the threshold value:
    - control the hot conduit control valve such that it is closed, thereby stopping a flow of heat transfer liquid of the hot conduit through the hot conduit control valve, and
    - control the first distribution pump such that it is active, thereby reducing the local pressure difference; and
  - while $p_{hot} > p_{cold}$ and $\Delta p <$ the threshold value:
    - control the first distribution pump such that it is inactive, and
    - control the hot conduit control valve such that it is open, thereby allowing a flow of heat transfer liquid of the hot conduit through the hot conduit control valve.

\* \* \* \* \*